May 29, 1945.  E. L. WILKINS  2,376,950
BEET HARVESTER
Filed Aug. 19, 1943  6 Sheets-Sheet 1

INVENTOR.
Edward L. Wilkins
BY
Victor J. Evans & Co.
ATTORNEYS

May 29, 1945.　　　　E. L. WILKINS　　　　2,376,950
BEET HARVESTER
Filed Aug. 19, 1943　　　6 Sheets-Sheet 5

INVENTOR.
Edward L. Wilkins
BY
Victor J. Evans & Co.
ATTORNEYS

May 29, 1945.    E. L. WILKINS    2,376,950
BEET HARVESTER
Filed Aug. 19, 1943    6 Sheets-Sheet 6
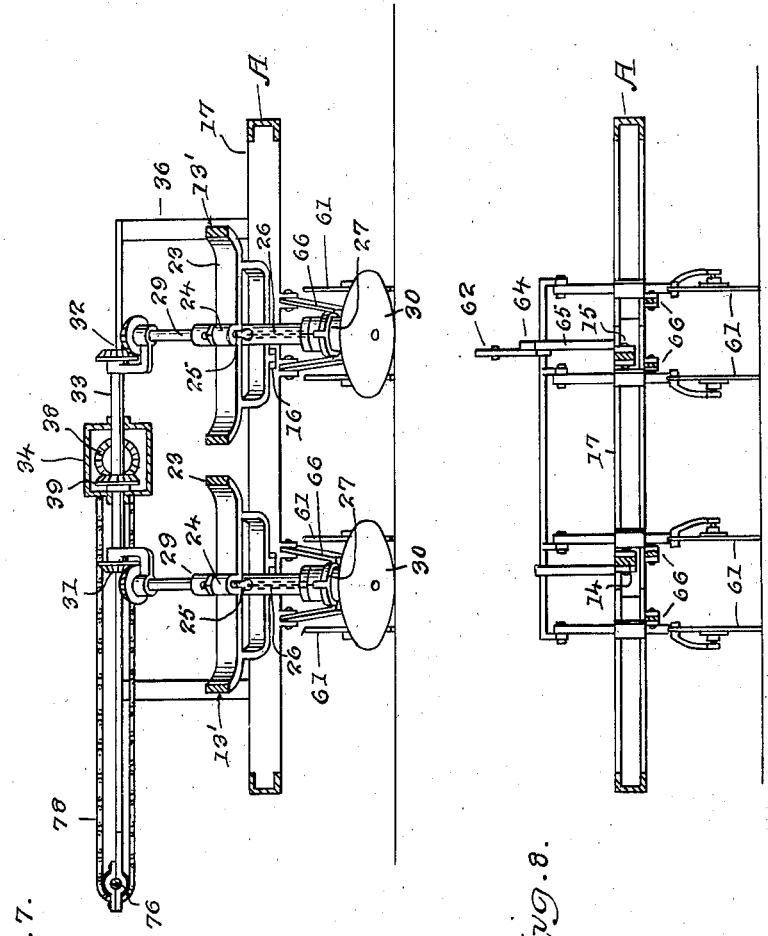
INVENTOR.
Edward L. Wilkins
BY
Victor J. Evans & Co.
ATTORNEYS Patented May 29, 1945

2,376,950

UNITED STATES PATENT OFFICE 2,376,950

BEET HARVESTER

Edward L. Wilkins, Las Animas, Colo.

Application August 19, 1943, Serial No. 499,262

4 Claims. (Cl. 55—9)

The invention relates to a harvesting machine and more especially to a beet harvester.

The primary object of the invention is the provision of a machine of this character, wherein growing beets within the soil are topped, trimmed, lifted and loaded into a truck or wagon in a single operation of the machine, the topper and lifter units of the machine being susceptible of independent use from the loading unit optional with the operator and where the soil is not in condition for the combined use of these units.

Another object of the invention is the provision of a machine of this character, wherein a single operator only is required for the servicing of the machine, the latter being drawn by a tractor or the like and straddling two rows of a crop of beets at a time, and the topping unit is such that it can be disconnected and used to windrow the beets, where they may be picked up and loaded with the loading unit.

A further object of the invention is the provision of a machine of this character, wherein the construction thereof is unique, compact, automatic in the working thereof, and novel in its entirety.

A still further object of the invention is the provision of a machine of this character, which is comparatively simple in construction, thoroughly reliable and efficient in operation, strong, durable, easy of operation, economical in the working thereof, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 7 is a sectional view taken on the line 7—7 of Figure 2 looking in the direction of the arrow.

Figure 8 is a sectional view taken on the line 8—8 of Figure 2 looking in the direction of the arrows.

Similar reference characters indicate corresponding parts throughout the several views in the drawings.

Figure 1:
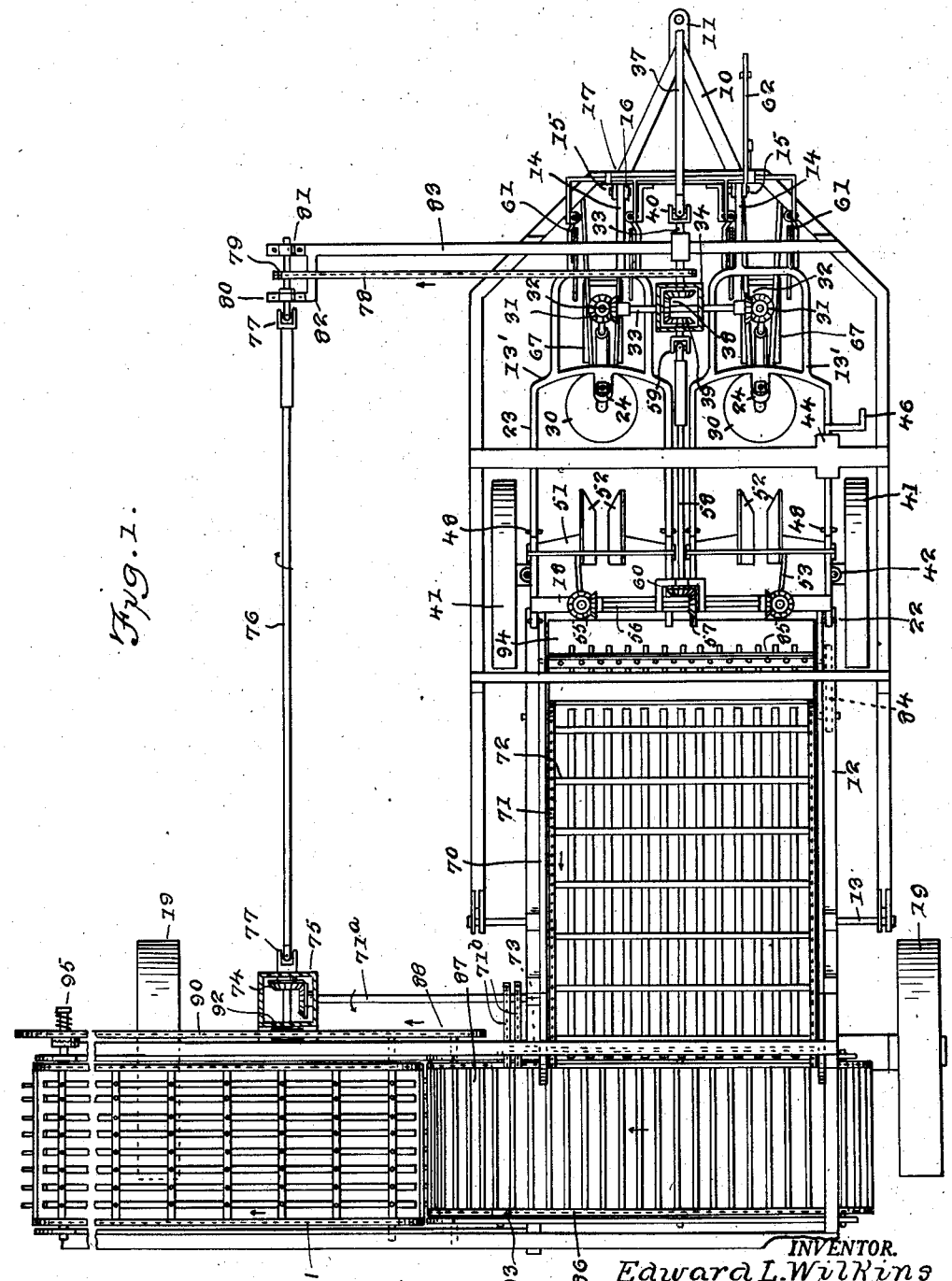
Figure 1 is a top plan view of the machine constructed in accordance with the invention.
Figure 2:
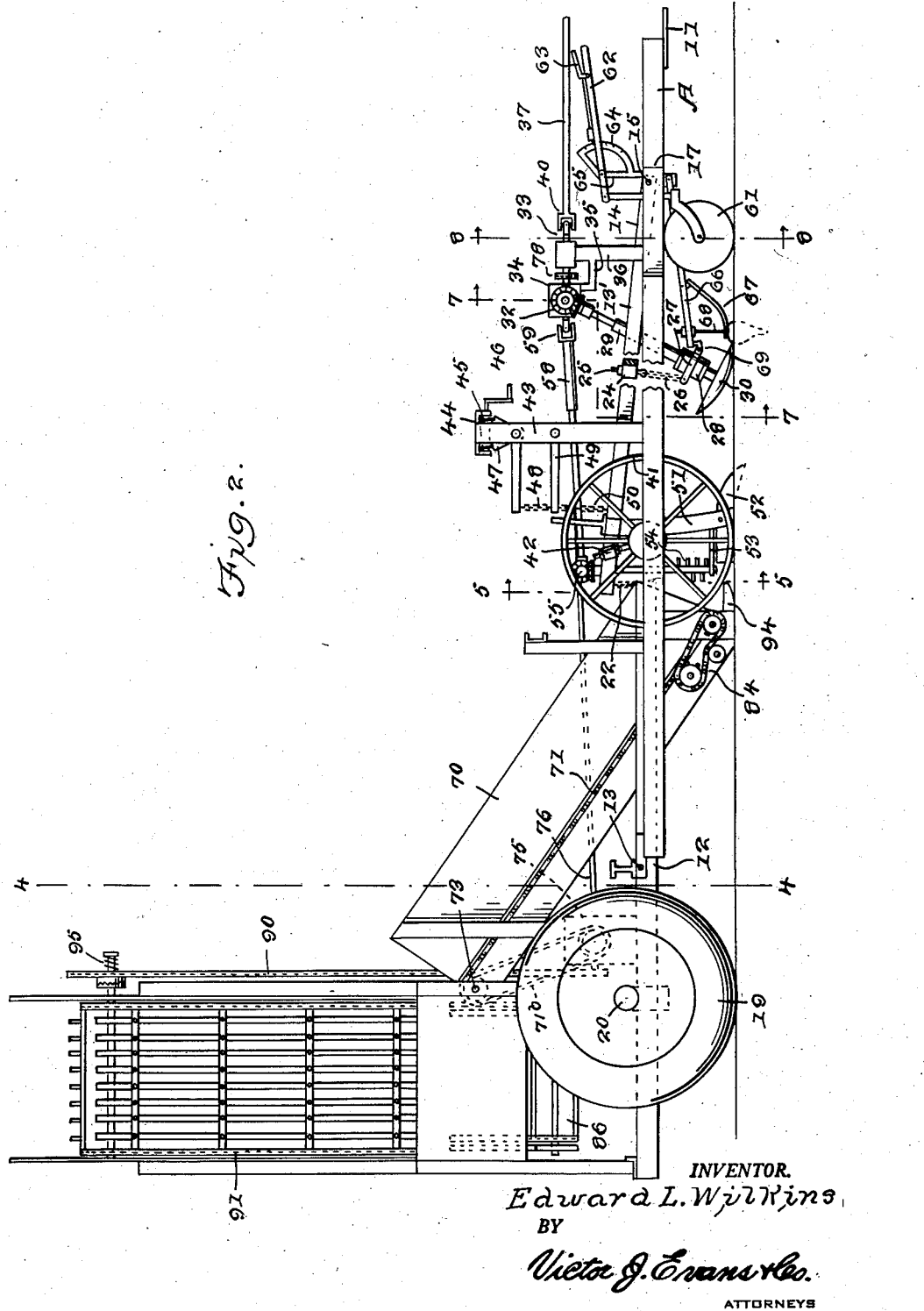
Figure 2 is a side elevation, partly broken away.
Figure 3:
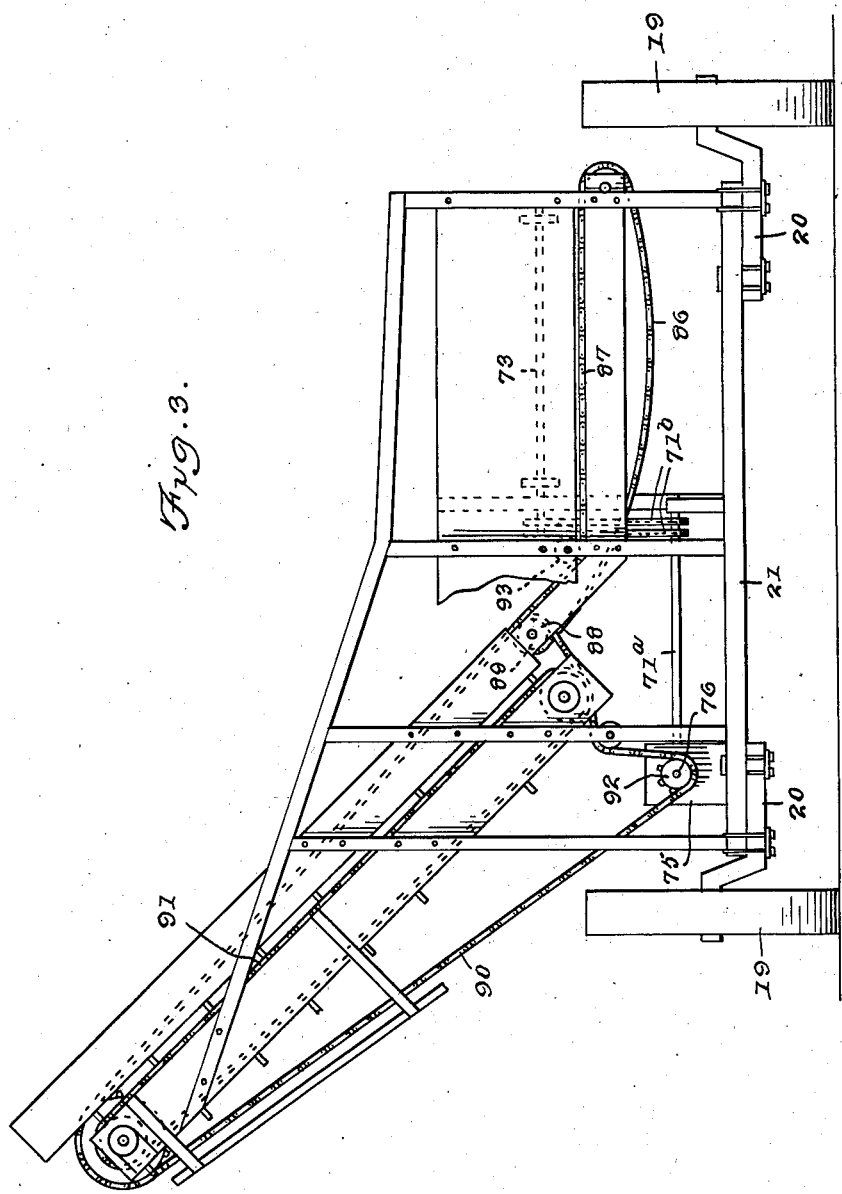
Figure 3 is a rear elevation.

Referring to the drawings in detail A designates generally a main supporting frame of the beet harvester machine, and includes a forwardly tapered front hitch end 10, its center hitch 11 being for the purpose of detachable connection with a tractor or the like (not shown), for the draft of the machine through a crop of growing beets. Hinged or otherwise pivotally connected to this main frame A at the rear thereof is a vertically swinging wheeled rear frame 12, its pivotal connection 13 being of a detachable type. Within this main frame A is a vertically swinging beet topper and lifter unit comprising side-by-side parallel double-yoke frames 13' which at their forward ends have pivot arms 14, these being pivoted at 15 to bearings 16 on the cross sill 17 at the front end 10 of the frame A. Each frame 13' at a distance removed from its rear end has attached thereto cross bracing bridge piece 18 to prevent spreading of the side portions thereof.

The rear frame 12 supports broad-tread traction wheels 19, which are journaled on stud axles 20 fixed to the said frame having a lateral substantially right-angular spread area 21 beyond the main frame A, the axles 20 being joined thereto. The hinge connections 13 between the main frame A and the rear frame 12 are preferably medially of the latter. At the forward end of this rear frame 12 are coupling chains 22 suspended from the rear ends of the yoke frames 13' for the loose connection therebetween, so that when the frames 13' are raised or lowered similar movement will be imparted to the forward end of the rear frame 12.

Formed centrally of the rearmost yoke portions 23 of the frames 13' are bearings 24 for hanger eyes 25 of suspension chains 26, these being connected with retaining collars 27, embracing hubs 28 for the power shafts 29 of concavo-convex disk type rotatable beet top cutters 30, the shafts 29 being of the telescopic extensible kind and being driven through pinion and gear connections 31 and 32, respectively, with a distributing shaft 33 journaled through a housing 34 bracketed at 35 on a front support 36 upon the main frame A. The distributing shaft 33 is operated from a driving shaft 37 through meshing companion gears 38 and 39, respectively, the shaft 37 being equipped with a universal joint 40 and being actuated from a power take-off (not shown) of a tractor.

The frames 13' at their rear carry ground wheels 41, these being journaled on adjustable stud axles 42 on the said frames 13'. Above and spaced from the frame A and over-hanging the frames 13' is an upright support 43 having a feed screw head 44 on the horizontal thereof in which a feed screw 45 provided with a crank handle 46 and meshing with a vertically swinging turning sector 47, these being located at one side of the frame A and such sector 47 has chain connection 48 with one of a series of lifter arms 49 which through chains 50 are connected with the frames 13 for the raising and lowering of the same.

Depending from the sides of the frames 13' rearwardly of the cutters 30 are downwardly curved convergent standards 51 carrying at their free spaced lower ends forwardly directed beet lifter shovels or blades 52 which function to penetrate the soil and extract growing beets therefrom on the advancement of the machine. At the heels of the outside shovels or blades are journal brackets 53 for vertical rotatable pickers 54, these being also journaled in the bridge pieces 18 where through gearings 55 are connected with a shaft 56, the latter by gearing 57 is driven by a supplemental shaft 58 of the extensible type and equipped with a universal joint 59, and its power is had through gearing 60 from the shaft 33.

Arranged at opposite sides of the path of the cutters 30 and in advance of the same on the frame A are coulters 61, which are vertically adjustable by a throw lever 62 provided with a hand release latch 63 engaging a stationary keeper segment 64, the latter being on an upright 65 for this lever 62.

Hinged to the cross sill 17 of the frame A at 65 are rearwardly directed vertically swingable carriers 66 for vertically adjustable shoes 67, the adjustable devices therefor being denoted at 68 and each shoe 67 co-acts with the companion cutter 30 to regulate the depth of top cutting of the beets by the latter. These carriers each is attached by a break joint 69 with the collar 27 so as not to interfere with the movement of the said cutter on the raising and lowering of the frame 13.

Figure 4:
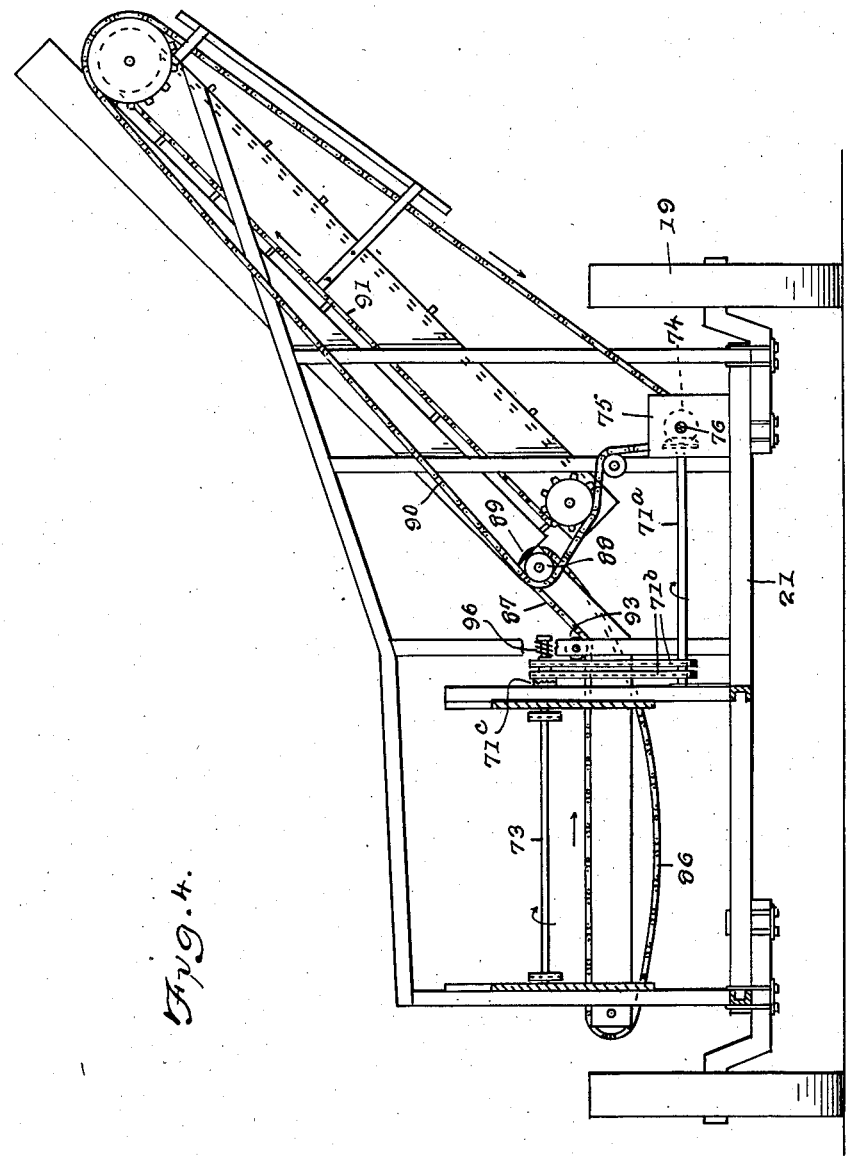
Figure 4 is a sectional view taken on the line 4—4 of Figure 2.
Figure 5:
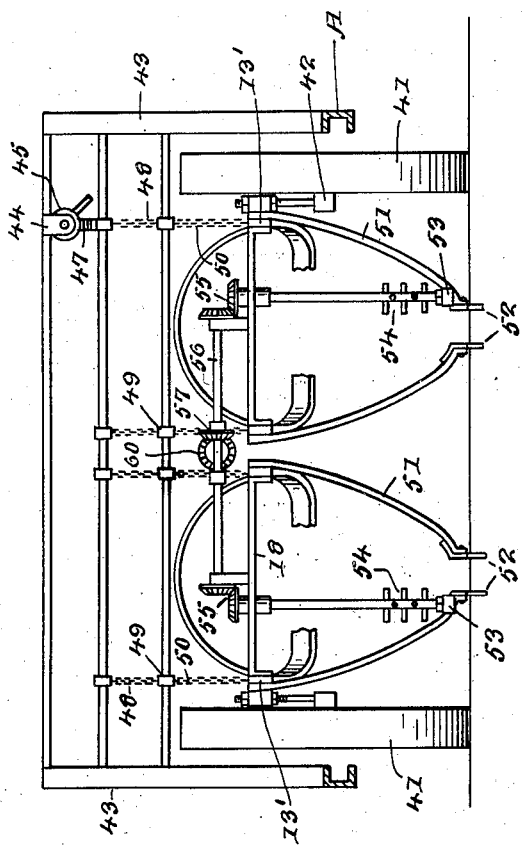
Figure 5 is a sectional view taken on the line 5—5 of Figure 2 looking in the direction of the arrows.
Figure 6:
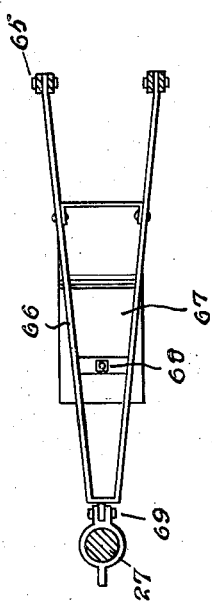
Figure 6 is a plan view of a regulating shoe for the beet tops.

On the rear frame 12, at the forward portion thereof, is an upwardly and rearwardly inclined conveyor 70 having an endless elevator 71 mounted therein, which is provided with transverse lift slats 72. The elevator 71 is driven from a shaft 71ª by means comprising sprocket chains 71ᵇ and a slip clutch 71ᶜ, as clearly shown in Figures 1 and 4. The shaft 71ª is driven from a shaft 76 by gears 74 mounted in a box 75. The shaft 76 is extensible, the sections of the latter being provided with universal joints 77 and this shaft 76 is driven by chain and sprocket connections 78 and 79, respectively, from the power shaft 37. One of the sections of the shaft 76 is journaled at 80, while the other section is journaled at 81 in a fork 82 of a cross support 83 on the frame A. The lower roller of the elevator 71 has driving connections at 84 with a horizontally disposed beater 85 journaled in the front open mouth of the said conveyor 70.

At the rear end of the frame 12 crosswise with respect to the conveyor 70 and beneath its high end thereof is a transferring apron or conveyor 86, its top stretch 87 being horizontally arranged and this conveyor 86 has driven connections 88 with a sprocket and chain arrangement at 89 and 90, respectively, of a loading elevator 91, the latter being driven from connections 92 with the shaft 76. A roller 93 acts on the horizontal stretch 87 of the conveyor 86 to maintain the said stretch so disposed. The load of the elevator 91 is delivered from its high end laterally to one side of the machine, that is to say, the frame A thereof.

At the mouth end of the elevator or conveyor 70 are runners 94 which contact with the ground to travel thereon. There are slip-clutches 95 and 96, respectively, provided in the connections hereinbefore described.

The wheels 19 support the entire machine at its rear, while the forward portion of the machine is coupled to the tractor and is supported thereby, in addition to the support the machine will have from the wheels 41 and runners 94, if any support may be had therefrom.

The machine is a complete harvesting machine to top, pull and load beets into a truck or wagon and the topping unit is built so that it can be disconnected and used to windrow the beets, where they may be picked up and loaded with the loading unit, the disconnection of these units being had at 13.

The machine in its entirety is pulled astraddle of two rows of growing beets with a tractor. The hitch to the tractor is had at 11. The main frame A carries the topping and pulling mechanism, as well as the wheeled frame 12. The cutters 30 cut the tops from the beets as the machine is advanced, while the shovels or blades 52 lift the growing beets from the soil, and the coulters 61 run on each side of the beet rows to trim the leaves on the side thereof. The shoes 67 for companion cutters 30 regulate the depth of top cutting of the beets.

The frames 13' can be raised with the ground wheels 41 and thus rendering the topping and lifting mechanisms inactive for their purposes.

The wheels 19 support the loading unit and also carry the whole machine when not in operation, the front of the said machine being supported by the tractor.

The points of the lifting shovels or blades are so constructed that as they run under the beets they lift them from the ground. The lifted beets are pushed by the rotary pegged shafts 54 and picked up by the beater 85 which throws the free beets onto the elevator 70 and this elevator delivers them to the screening transfer apron 87 which takes out the dirt and delivers the beets to the loading mechanism 91 which carries them to a truck or wagon. The machine in the working thereof requires a single attendant.

What is claimed is:

1. A machine of the kind described, comprising a main frame having means for connecting beet elevating and loading mechanism thereto, side-by-side yoke-frames having common pivotal connection with the fore part of the main frame, beet topping mechanism suspended in working position by said yoke-frames, beet lifting mechanism carried by the yoke-frames and following the topping mechanism, ground engaging shoes adjustably connected with the main frame and with the topping mechanism for adjusting the same, adjustable coulters in advance of the said means, mechanism for raising and lowering the yoke-frames, ground wheels on the yoke-frames, pickers operative adjacent to the lifting mechanism, and flexible connections for elevating and loading mechanism on the yoke-frames.

2. A machine of the kind described, comprising a main frame having means for connecting beet elevating and loading mechanism thereto, side-by-side yoke-frames having common pivotal connection with the fore part of the main frame, beet topping mechanism suspended in working position by said yoke-frames, beet lifting mechanism carried by the yoke-frames and following the topping mechanism, ground engaging shoes adjustably connected to the main frame, and with the topping mechanism for adjusting the same, adjustable coulters in advance of the said means, mechanism for raising and lowering the yoke-frames, ground wheels on the yoke-frames, pickers operative adjacent to the lifting mechanism, flexible connections for elevating and loading mechanisms on the yoke-frames, and a picker shaft associated with the lifter mechanism.

3. A machine of the kind described, comprising a main frame having means for connecting beet elevating and loading mechanism thereto, side-by-side yoke-frames having common pivotal connection with the fore part of the main frame, beet topping mechanism suspended in working position by said yoke-frames, beet lifting mechanism carried by the yoke-frames and following the topping mechanism, ground engaging shoes adjustably connected to the main frame and with the topping mechanism for adjusting the same, adjustable coulters in advance of the said means, mechanism for raising and lowering the yoke-frames, ground wheels on the yoke-frames, pickers operative adjacent to the lifting mechanism, flexible connections for elevating and loading mechanisms on the yoke frames, a picker shaft associated with the lifter mechanism, and driving connections coacting with each other for the topping, elevator and loading mechanisms, and pickers.

4. A machine of the kind described, comprising a main frame having means for connecting beet elevating and loading mechanism thereto, side-by-side yoke-frames having common pivotal connection with the fore part of the main frame, beet topping mechanism suspended in working position by said yoke-frames, beet lifting mechanism carried by the yoke-frames and following the topping mechanism, ground engaging shoes adjustably connected with the main frame and with the topping mechanism for adjusting the same, adjustable coulters in advance of the said means, mechanism for raising and lowering the yoke-frames, ground wheels on the yoke-frames, pickers operative adjacent to the lifting mechanism, flexible connections for elevating and loading mechanisms on the yoke-frames, a picker shaft associated with the lifter mechanism, and driving connections co-acting with each other for the topping, elevator and loading mechanisms, and pickers.

EDWARD L. WILKINS.